United States Patent [19]
Fitzgibbons et al.

[11] Patent Number: 6,101,968
[45] Date of Patent: Aug. 15, 2000

[54] POWER-ASSIST CAKE DECORATOR

[75] Inventors: James F. Fitzgibbons, Bantam; Christopher Young, South Kent, both of Conn.

[73] Assignee: Innovative Injectors, Inc., New Milford, Conn.

[21] Appl. No.: 09/131,154

[22] Filed: Aug. 7, 1998

Related U.S. Application Data

[60] Provisional application No. 60/055,216, Aug. 11, 1997.

[51] Int. Cl.[7] .................................................. A23G 3/20
[52] U.S. Cl. .............................. 118/14; 118/24; 118/300; 222/262; 222/263; 222/324; 222/327; 222/333; 222/383.1; 99/345; 99/532
[58] Field of Search .............................. 118/14, 24, 300; 239/329, 331, 332, 154; 222/262, 263, 324, 327, 333, 383.1; 99/345, 532; 156/578

[56] References Cited

U.S. PATENT DOCUMENTS

| | | | |
|---|---|---|---|
| 4,257,540 | 3/1981 | Wegmann et al. | 222/262 |
| 5,027,984 | 7/1991 | Gakhar et al. | 222/326 |
| 5,337,525 | 8/1994 | Zaccai et al. | |
| 5,634,531 | 6/1997 | Graf et al. | 184/37 |
| 5,971,229 | 10/1999 | May et al. | 222/390 |

*Primary Examiner*—Laura Edwards
*Attorney, Agent, or Firm*—Dallett Hoopes

[57] ABSTRACT

In the housing is a motor and gear train driven by the motor, the train adapted to selectively engage a gear rack secured to the compression element to drive it down to squeeze the collapsible frosting container. When the train has moved into engagement, it closes a switch activating the motor.

6 Claims, 3 Drawing Sheets

POWER-ASSIST CAKE DECORATOR

CROSS REFERENCE TO RELATED APPLICATIONS

This application is based on the invention described in the Provisional patent application Ser. No. 60/055,216 filed Aug. 11, 1997.

FIELD OF THE INVENTION

This invention relates to cake and cookie decorators. More specifically, this invention relates to a cake decorator having a power-assist feature.

BACKGROUND OF THE INVENTION

This invention is an improvement on the device described in U.S. Pat. No. 5,337,525 issued Aug. 16, 1994, said patent being incorporated hereinto by reference. The invention of the referenced patent is meritorious. It has been noted, however, in working with decorative fluids of more viscous nature, such as heavy sugar/butter decorating concoctions that the squeezing of the hand grip of the device is difficult for people who are weak or arthritic. The present invention is a power-assist feature for such situations.

SUMMARY OF THE INVENTION

The present invention provides a motor and gear train driven by the motor, the train adapted to selectively mesh with a gear rack secured to the compression element to assist in driving the element down. The invention also includes means for activating the motor which means is disposed in the hand grip and comprises a spring resisted operator naturally engaged by the hand of the user in the process of gripping the hand grip. In the preferred form the means for activating the motor also causes the gear train to mesh with the gear rack.

BRIEF DESCRIPTION OF THE DRAWINGS

Further objects and features of the invention will be clear to those skilled in the art from a review of the following specification and drawings, all of which present a non-limiting form of the invention. In the drawings.

DESCRIPTION OF THE PREFERRED EMBODIMENT

Figure 1:
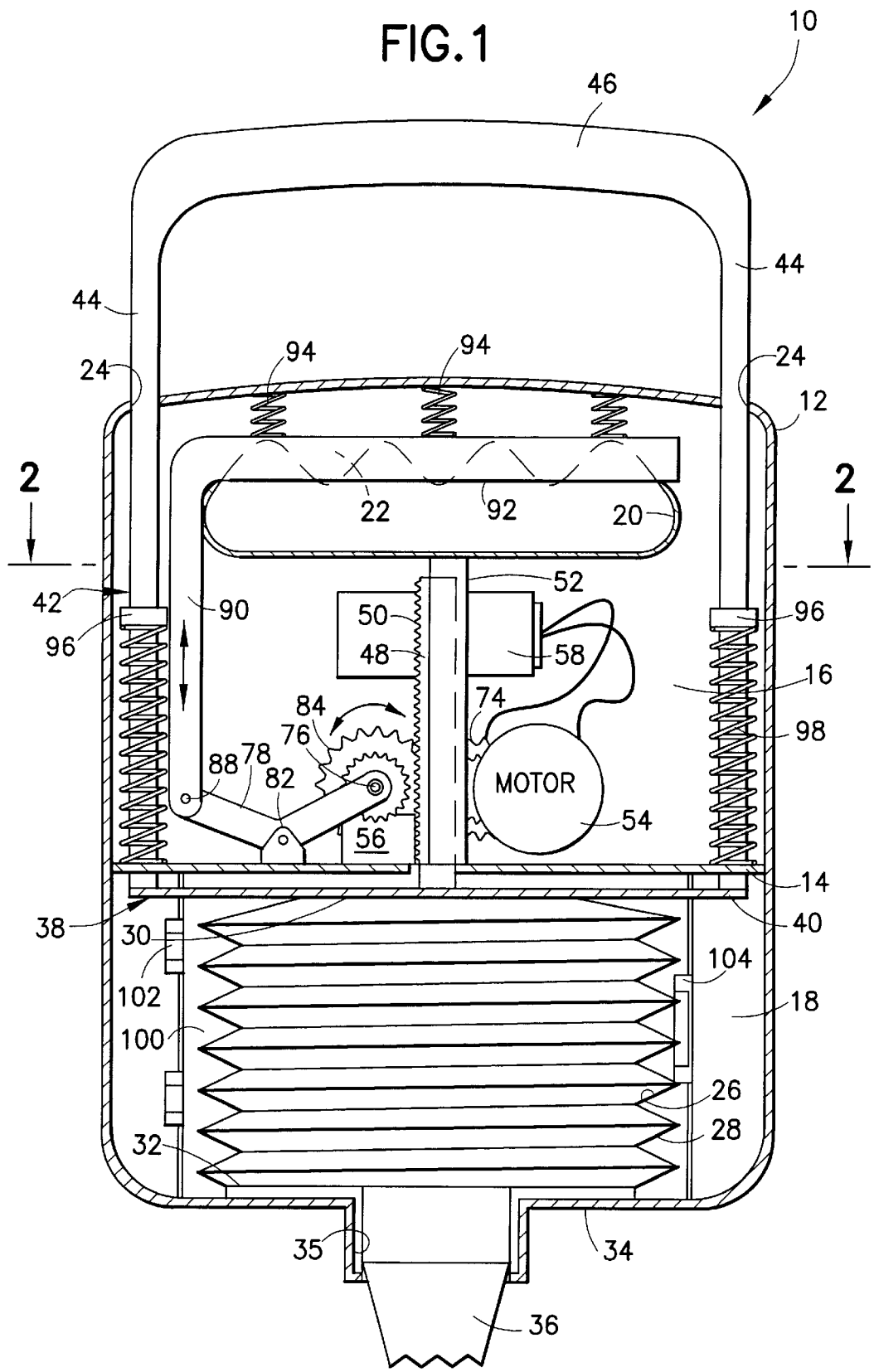
FIG. 1 is a vertical section through the center line of the decorator.

A decorator device is shown in FIG. 1 and generally designated 10. It comprises a hollow housing 12 having a transverse dividing wall 14 dividing the housing into an upper chamber 16 and a lower chamber 18. The upper end of the housing has a transverse opening 20 to define a squeeze bar 22. On either side of the squeeze bar the housing is formed with apertures 24.

Figure 3:
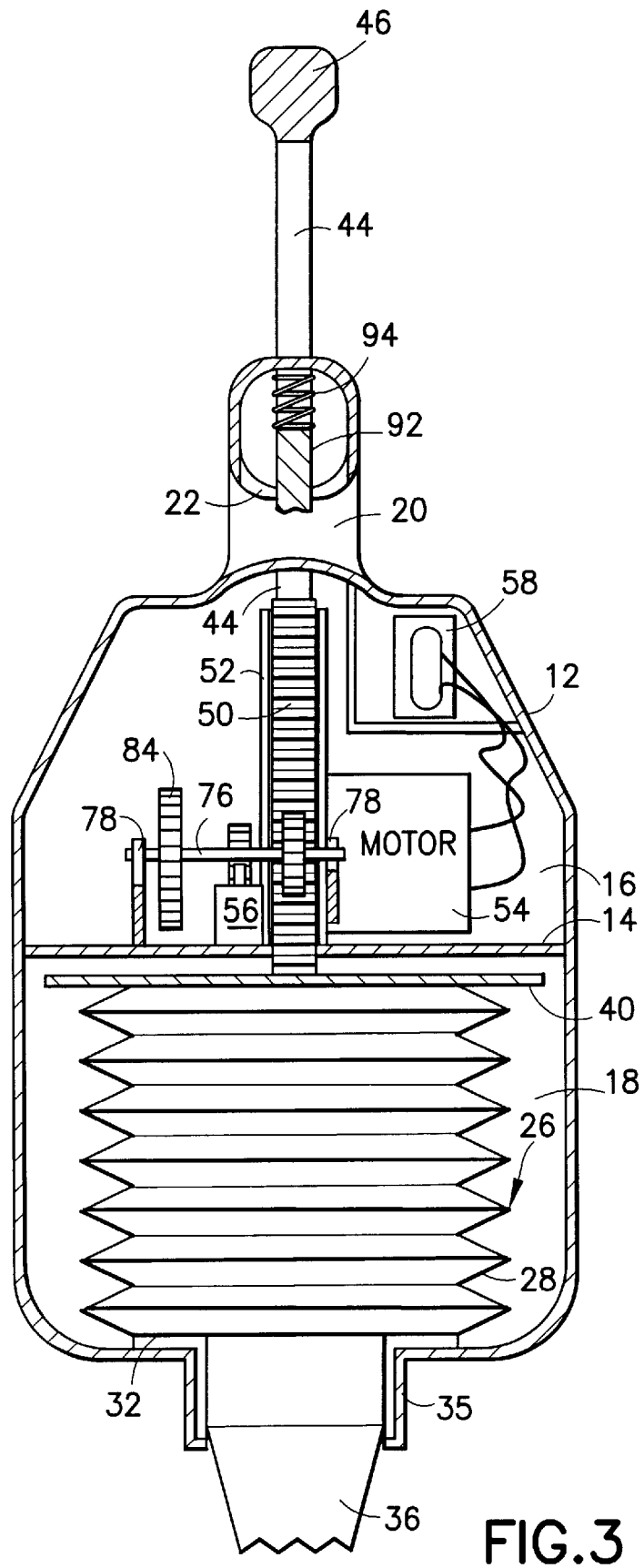
FIG. 3 is a sectional view taken on the line 3—3 of FIG. 2.

The lower chamber encloses a container 26 comprising collapsible bellows-type side walls 28 and attached upper wall 30 and lower wall 32. The lower wall rests on the lower end of the housing 34. Communicating with the inside of the container 26 is the tubular dispensing injection needle 36 which has been broken away in FIGS. 1 and 3 to save drawing space. The needle passes through an opening 35 in the bottom wall.

A compression element 38 includes a pressure plate 40 disposed below the dividing wall 14 and engaging the upper wall of the container 26. The compression element also includes an inverted U-shaped element 42. The legs 44 of the element 42 are secured to the pressure plate 40 and extend through appropriate openings in the transverse wall 14 and through the apertures 24 in the housing. The bight 46 of the element serves as a palm rest and the palm rest and squeezing bar 22 comprise a hand grip.

Figure 2:
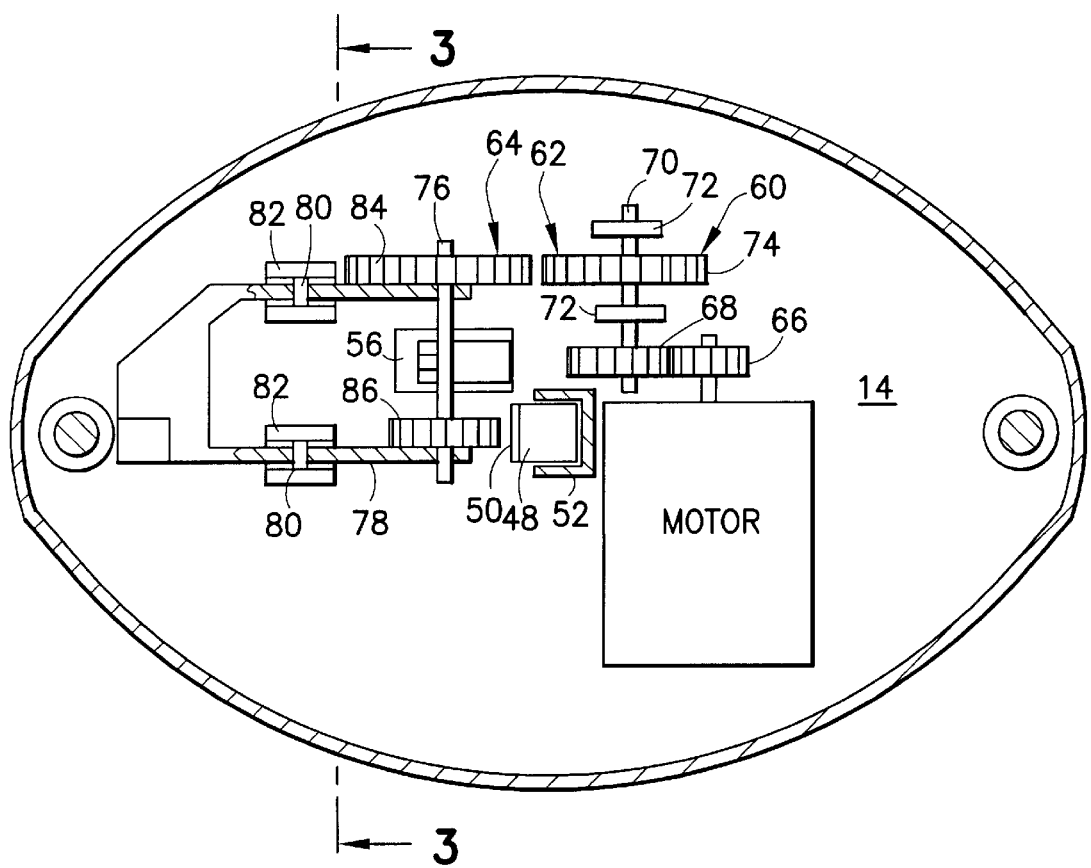
FIG. 2 is a sectional view taken on the line 2—2 of FIG. 1.

An upward element 48 extends upward preferably from a central location from a pressure plate 40. The element 48 extends through an opening in the transverse dividing wall 14. It is formed with a gear rack 50 along a vertical face. The upward element is slidably received into a guide 52 which may be C-shaped in cross-section (FIG. 2). The guide is part of the transverse wall 14.

An electric motor 54 is mounted on the transverse dividing wall 14 and is connected by wires as shown through a microswitch 56 also mounted on the dividing wall 14 to an appropriate battery 58 preferably rechargeable. The motor drives a gear train 60 (FIG. 2) comprising a stationary section 62 and a translatable section 64. The stationary section comprises a pinion 66 which engages a spur gear 68 mounted on a shaft 70 journaled in aligned bearings 72 secured to the dividing wall 14. Between the bearings 72 is a second spur gear 74.

The translatable section 64 (FIG. 2) comprises a shaft 76 which journals in a yoke 78 pivotally mounted on pins 80 supported by spaced brackets 82 coming up from the transverse dividing wall 14. The shaft 76 is provided with a driven spur gear 84 aligned with the spur gear 74 and a driving spur gear 86 which is aligned with the gear rack 50 on the upward element 48. The yoke 78 is of non-linear shape (FIG. 1) and is provided on its end opposite the shaft 76 with a pin 88 to which is attached the lower leg of an L-shaped translating bar 90, the upper horizontal leg 92 of which is disposed in a slot in the housing and partially appears in the opening 20. Springs 94 oppose the raising of the horizontal leg 92 and are carefully selected to provide the proper resistance to accomplish the objective of the power-assist system.

The legs 44 of the inverted U-shaped element are provided with fixed collars 96 and axial springs 98 are disposed around the legs compressively between the collars 96 and the transverse dividing wall 14. A door 100 having hinges 102 and latch 104 gives access to the lower chamber for removal of the container 26 along with the injection needle 36 for cleaning and refilling as necessary.

In operation, the filled container 26 and needle 36 are maneuvered into the lower chamber 18 through the door 100 so that the needle 36 extends out through opening 35. The upper wall 30 of the container engages the plate 40. The door is closed and latched. The user grips the end grip with the palm rest and the squeeze bar 20, the user's fingers extending through opening 20 and disposed between the undulations of the lower margin of the grip. For relatively thin fluids, the user can squeeze down on the palm rest causing the pressure plate 40 to lower, extruding fluid substance out the container 26 and through the needle 36 extruding fluid out the end of the needle out to the product to be decorated.

With less fluid substances, the user squeezes down harder causing his fingers to raise the horizontal end 92 of the translation bar 92 to raise against the force of the springs 94. This causes the translation section 64 to pivot down about pins 80 so that spur gear 84 engages spur gear 74 and the driving gear 86 engages the rack 50. As the translatable section reaches this working position, the shaft 76 engages the operator (not shown) of the switch 56 to close the circuit energizing the motor 54 and activating the power-assist which is the subject of the invention. This results in the motor 54 and the gear drain 60 driving down the upward element 48 to apply additional pressure as the pressure plate 40 lowers, squeezing the container 26 and causing the bellows-like collapsible wall 28 to reduce in height.

It should be understood while the invention is described as a decorator, it may be used as described in the U.S. Pat. No. 5,337,525 as an injector of fluids into meats and so on. Rearrangements of the structure are possible, for instance, the gear rack 50 may be put on one of the legs 44 of the inverted U-shaped element. The arrangement shown is preferred.

Variations in the invention are possible. Thus, while the invention has been shown in only few embodiments, it is not so limited but is of a scope defined by the following claim language which may be broadened by an extension of the right to exclude others from making, using or selling the invention as is appropriate under the doctrine of equivalents.

What is claimed is:

1. A power-assist cake decorator comprising:
   a. a hollow housing having an upper end and a transverse wall dividing the housing into upper and lower chambers and having a transverse opening through the upper end to define a squeeze bar and formed with apertures on either side of the squeeze bar,
   b. a container for pastry in the lower chamber having collapsible sidewalls and upper and lower walls and a tubular dispensing injection needle extending through a lower wall of the housing,
   c. a compression element having a pressure plate engaging the upper wall of the container, the pressure plate having an inverted U-shaped element defined by parallel legs and a connecting bight, the legs of the element extending through the respective apertures and secured to the plate, the bight of the element serving as a palm rest, the palm rest and squeeze bar comprising a hand grip, the compression element having an upward element formed with a gear rack therein,
   d. a power-assist motor and gear train, said gear train driven by the motor, a gear in the gear train adapted to selectively mesh with the gear rack to drive down the compression element to extrude pastry through the needle, and
   e. means for facilitating the meshing and activating the motor, said means for facilitating and activating comprising an actuator disposed in the hand grip and adapted to be naturally engaged by the hand of the user in the process of gripping the hand grip to effect dispensing of the cake decorating material from the needle.

2. A power-assist cake decorator comprising:
   a. a hollow housing having an upper end and within the housing a transverse wall dividing the housing into upper and lower chambers and having a transverse opening through the upper end thereof to define a squeeze bar and formed with apertures on either side of the squeeze bar,
   b. a container in the lower chamber having collapsible sidewalls and upper and lower walls and a tubular dispensing injection needle extending through a lower wall of the housing,
   c. a compression element having a pressure plate engaging the upper wall of the container, the pressure plate having an inverted U-shaped element comprising parallel legs and a connecting bight, the legs of the element extending through the apertures respectively and secured to the pressure plate, the bight of the element serving as a palm rest, the palm rest and squeeze bar comprising a hand grip, the compression element having an upward element formed with a gear rack therein,
   d. a motor and a gear train driven by motor, a gear in the gear train adapted to selectively mesh with the gear rack to drive down the compression element, and
   e. means for translating said gear to bring said gear into meshing engagement with the gear rack.

3. A power-assist cake decorator as claimed in claim 2, said means for translating including means to activate the motor.

4. A power-assist cake decorator as claimed in claim 2, said means for translating including a shaft on which said gear is mounted, an arm having one end rotatably supporting the shaft and another end pivotally mounted on the transverse wall, and an actuator movably mounted on the hand grip and adapted to be depressed when the handle is gripped, the actuator being linked to the arm to move the gear into engagement with the gear rack when the operator is depressed.

5. A power-assist cake decorator as claimed in claim 4 further including an electric switch engaged by the means for translating when the operator is depressed.

6. A power-assist cake decorator as claimed in claim 2, wherein the transverse wall is formed with a guide, slidably receiving the upward element.

* * * * *